United States Patent
Arshad et al.

(10) Patent No.: US 12,512,885 B2
(45) Date of Patent: Dec. 30, 2025

(54) NETWORK CONNECTION CONTROL

(71) Applicant: Motion Applied Limited, Woking (GB)

(72) Inventors: Sohail Arshad, Woking (GB); Daniel Steer, Woking (GB)

(73) Assignee: Motion Applied Limited, Woking (GB)

( * ) Notice: Subject to any disclaimer, the term of this patent is extended or adjusted under 35 U.S.C. 154(b) by 0 days.

(21) Appl. No.: 18/869,688

(22) PCT Filed: Sep. 18, 2023

(86) PCT No.: PCT/GB2023/052411
§ 371 (c)(1),
(2) Date: Nov. 26, 2024

(87) PCT Pub. No.: WO2024/057044
PCT Pub. Date: Mar. 21, 2024

(65) Prior Publication Data
US 2025/0175224 A1    May 29, 2025

(30) Foreign Application Priority Data
Sep. 16, 2022 (GB) .................................. 2213613

(51) Int. Cl.
*H04B 7/02* (2018.01)
*H04B 7/06* (2006.01)
(Continued)

(52) U.S. Cl.
CPC ............ *H04B 7/0608* (2013.01); *H04W 4/42* (2018.02); *H04W 84/005* (2013.01); *H04W 84/12* (2013.01)

(58) Field of Classification Search
CPC .... H04B 7/0608; H04W 4/42; H04W 84/005; H04W 84/12
(Continued)

(56) References Cited

U.S. PATENT DOCUMENTS 10,862,558 B1 * 12/2020 Aminikashani ...... H01Q 1/3216
2017/0238141 A1    8/2017 Lindoff et al.
(Continued)

FOREIGN PATENT DOCUMENTS

CN    108964738 B    9/2021
EP    1914146 A2    4/2008
(Continued)

OTHER PUBLICATIONS

International Search Report and Written Opinion in International Appln. No. PCT/GB2023/052411, mailed on Dec. 4, 2023, 10 pages.
(Continued)

*Primary Examiner* — Zewdu A Kassa
(74) *Attorney, Agent, or Firm* — Fish & Richardson P.C.

(57) ABSTRACT

Disclosed is a method for controlling the connection of antenna units to a wireless local area network. The wireless local area network comprises one or more antenna units being implemented on a vehicle. The method comprises: obtaining one or more characteristics about a further antenna unit that is external to the network; comparing the one or more characteristics about the further antenna unit with one or more predetermined characteristics; and in dependence on the comparison between the characteristics indicating that the further antenna unit is located on the vehicle, permitting the further antenna unit to connect to the network.

20 Claims, 4 Drawing Sheets

(51) Int. Cl.
*H04W 4/42* (2018.01)
*H04W 84/00* (2009.01)
*H04W 84/12* (2009.01)

(58) Field of Classification Search
USPC ............... 375/267, 260, 259, 219, 295, 316
See application file for complete search history.

(56) References Cited

U.S. PATENT DOCUMENTS

2023/0140472 A1* 5/2023 Lee ..................... H04B 7/0602
 343/702
2023/0387976 A1* 11/2023 Elhadeedy ........... H04B 7/0834

FOREIGN PATENT DOCUMENTS

| | | | |
|---|---|---|---|
| EP | 2093122 | A1 | 8/2009 |
| GB | 2455976 | A | 7/2009 |
| WO | WO 2002/019566 | A1 | 3/2002 |

OTHER PUBLICATIONS

Office Action in Great Britain Appln. No. GB2213613.9, mailed on Aug. 27, 2024, 6 pages.
Search Report in Great Britain Appln. No. GB2213613.9, mailed on Mar. 1, 2023, 3 pages.

* cited by examiner

NETWORK CONNECTION CONTROL

CROSS-REFERENCE TO RELATED APPLICATIONS

The present application is the national stage entry of International Application No. PCT/GB2023/052411, filed on Sep. 18, 2023, which claims priority to Application No. GB2213613.9, filed in the United Kingdom on Sep. 16, 2022, the disclosures of which are expressly incorporated herein in their entirety by reference thereto.

TECHNICAL FIELD

This invention relates to a method for controlling the connection of antenna units to a wireless local area network implemented on a vehicle.

BACKGROUND

Typical communications systems on a vehicle, such as a train, utilise one or two gateways. The vehicle may comprise multiple segments that have been joined together. For instance, a train comprises multiple carriages that have been coupled together.

Each gateway has access to an external network, such as the internet, to provide connectivity services to users on the vehicle. These users may have one or more client devices that require access to the external network. Each gateway can connect to the external network using a cellular modem. In this way, the gateways are configured to provide access to the client devices over the cellular network to the external network. The gateways may share bandwidth between them to improve the reliability and connection speed for the client devices.

Typically, these gateways are manually configured when they are installed on the vehicle. Part of this configuration is to establish links between the multiple gateways present on the vehicle and setting up redundancy between them. In addition, these gateways tend to be installed within the vehicle with at least one passive roof antenna for each gateway fitted to the roof of the vehicle. Multiple antennas may be required depending on the number of mobile networks and MIMO configuration that needs to be supported. This means the gateways need to be installed in segments of the vehicle where access to the roof antennas is available. Usually the connection between the gateways and the roof antennas involves connections using RF cables and RF splitters which have a detrimental impact on the signals sent and received by the antenna and gateway.

The typical installation of the antennas and gateways on a vehicle are time consuming to install and set up. As they are manually configured, a change in the formation of the vehicle (such as a replacement carriage on a train) requires the gateways to be manually reconfigured to re-establish cross communication and redundancy.

In addition, it is important that only antennas which are located on the vehicle are allowed to be connected to the network.

It is therefore desirable for there to be an improved method of controlling the connection of antenna units to a network implemented on a vehicle.

SUMMARY

According to a first aspect of the present invention there is provided a method for controlling the connection of antenna units to a wireless local area network, the wireless local area network comprising one or more antenna units and being implemented on a vehicle, the method comprising: obtaining one or more characteristics about a further antenna unit that is external to the network; comparing the one or more characteristics about the further antenna unit with one or more predetermined characteristics; and in dependence on the comparison between the characteristics indicating that the further antenna unit is located on the vehicle, permitting the further antenna unit to connect to the network.

The method may comprise repeatedly obtaining characteristics about the further antenna unit, repeatedly comparing the characteristics about the further antenna unit with the predetermined characteristics, and in dependence on the comparison between the characteristics indicating that the further antenna unit is located on the vehicle, permitting the further antenna unit to connect to the network.

The method may comprise, after the further antenna unit is permitted to connect to the network, stopping obtaining characteristics about the further antenna unit.

The method may comprise, after the further antenna unit is permitted to connect to the network, continuing to obtain characteristics about the further antenna unit and to compare the characteristics about the further antenna unit with the predetermined characteristics, and in dependence on the comparison between the characteristics indicating that the further antenna unit is no longer located on the vehicle, disconnecting the further antenna unit from the network.

The method may comprise obtaining characteristics about each of the antenna units that are in the network and comparing the characteristics about each of the antenna units that are in the network with the predetermined characteristics, and in dependence on the comparison between the characteristics indicating that one or more of the antenna units are no longer located on the vehicle, disconnecting those one or more of the antenna units from the network.

The characteristics about an antenna unit may comprise a signal obtained from that antenna unit.

The method may comprise permitting the further antenna unit to connect to the network in dependence on its signal being higher than a predetermined signal threshold.

The method may comprise disconnecting one or more of the antenna units from the network in dependence on its signal being lower than a predetermined signal threshold.

The characteristics about an antenna unit may comprise a signal to noise ratio of the signal obtained from that antenna unit.

The method may comprise permitting the further antenna unit to connect to the network in dependence on its signal to noise ratio of the signal being higher than a predetermined signal to noise ratio threshold.

The method may comprise disconnecting one or more of the antenna units from the network in dependence on its signal to noise ratio of the signal being lower than a predetermined signal to noise ratio threshold.

The characteristics about an antenna unit may comprise an age of beacons obtained from that antenna unit.

The method may comprise permitting the further antenna unit to connect to the network in dependence on its age of beacons being lower than a predetermined time threshold.

The method may comprise disconnecting one or more of the antenna units from the network in dependence on its age of beacons being higher than a predetermined time threshold.

The characteristics about an antenna unit may comprise a GNSS location obtained from that antenna unit.

The method may comprise permitting the further antenna unit to connect to the network in dependence on its GNSS location being within a predetermined distance threshold from a predefined point in the network.

The method may comprise disconnecting one or more of the antenna units from the network in dependence on its GNSS location being outside of a predetermined distance threshold from a predefined point in the network.

The method may comprise permitting the further antenna unit to connect to the network in dependence on a predefined number of characteristics about the further antenna unit meeting a required criterion.

The method may comprise disconnecting one or more antenna units from the network in dependence on a predefined number of characteristics about the antenna unit not meeting a required criterion.

The method may comprise, before obtaining one or more characteristics about the further antenna unit that is external to the network, adding a further part to the vehicle, the further part comprising the further antenna unit; and in dependence on the comparison between the characteristics indicating that the further antenna unit is now located on the vehicle, permitting the further antenna unit to connect to the network.

According to a second aspect of the present invention there is provided a method for controlling the connection of antenna units to a wireless local area network, the wireless local area network comprising one or more antenna units and being implemented on a vehicle, the method comprising: obtaining one or more characteristics about an antenna unit that is in the network; comparing the one or more characteristics about the antenna unit with one or more predetermined characteristics; and in dependence on the comparison between the characteristics indicating that the further antenna unit is not located on the vehicle, disconnecting the antenna unit from the network.

The method may comprise repeatedly obtaining characteristics about the antenna unit, repeatedly comparing the characteristics about the antenna unit with the predetermined characteristics, and in dependence on the comparison between the characteristics indicating that the antenna unit is not located on the vehicle, disconnecting the antenna unit from the network.

The method may comprise comprises, after the antenna unit is disconnected from the network, stopping obtaining characteristics about the antenna unit.

The characteristics about an antenna unit may comprise a signal obtained from that antenna unit.

The method may comprise disconnecting one or more of the antenna units from the network in dependence on its signal being lower than a predetermined signal threshold.

The characteristics about an antenna unit may comprise a signal to noise ratio of the signal obtained from that antenna unit.

The method may comprise disconnecting one or more of the antenna units from the network in dependence on its signal to noise ratio of the signal being lower than a predetermined signal to noise ratio threshold.

The characteristics about an antenna unit may comprise an age of beacons obtained from that antenna unit.

The method may comprise disconnecting one or more of the antenna units from the network in dependence on its age of beacons being higher than a predetermined time threshold.

The characteristics about an antenna unit may comprise a GNSS location obtained from that antenna unit.

The method may comprise disconnecting one or more of the antenna units from the network in dependence on its GNSS location being outside of a predetermined distance threshold from a predefined point in the network.

The method may comprise disconnecting an antenna unit from the network in dependence on a predefined number of characteristics about the antenna unit not meeting a required criterion.

The method may comprise, before obtaining one or more characteristics about the antenna unit, removing a part of the vehicle, the part comprising the antenna unit, and in dependence on the comparison between the characteristics indicating that the antenna unit is no longer located on the vehicle, disconnecting the antenna unit from the network.

The network may comprise a L2 mesh. The vehicle may be a train.

According to a third aspect of the present invention there is provided a wireless local area network system comprising one or more antenna units, the system being configured to: obtain one or more characteristics about a further antenna unit that is external to the network; compare the one or more characteristics about the further antenna unit with one or more predetermined characteristics; and in dependence on the comparison between the characteristics indicating that the further antenna unit is located on the vehicle, permit the further antenna unit to connect to the network.

According to a fourth aspect of the present invention there is provided a wireless local area network system comprising one or more antenna units, the system being configured to: obtain one or more characteristics about an antenna unit that is in the network; compare the one or more characteristics about the antenna unit with one or more predetermined characteristics; and in dependence on the comparison between the characteristics indicating that the further antenna unit is not located on the vehicle, disconnect the antenna unit from the network.

BRIEF DESCRIPTION OF THE DRAWINGS

The present invention will now be described by way of example with reference to the accompanying drawings. In the drawings.

DETAILED DESCRIPTION

The following description is presented to enable any person skilled in the art to make and use the invention, and is provided in the context of a particular application.

Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a method for controlling the connection of antenna units to a wireless local area network implemented on a vehicle.

Figure 1:
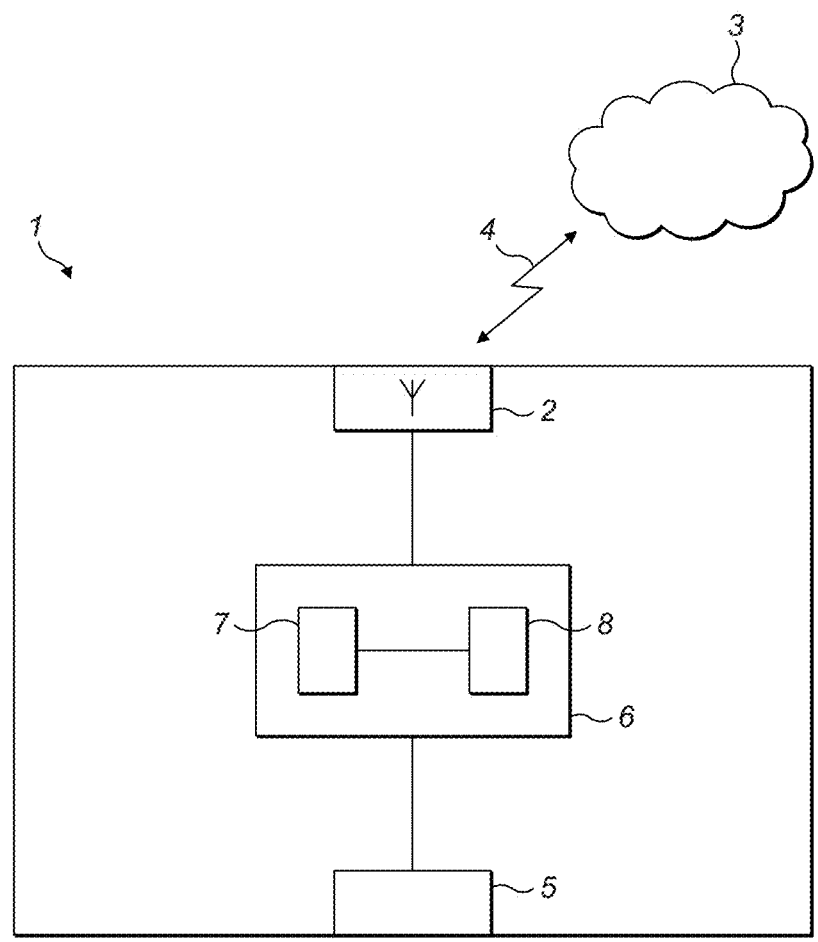
FIG. 1 shows an antenna unit.

FIG. 1 shows an antenna unit 1.

The antenna unit 1 comprises a wireless communication interface 2. The wireless communications interface 2 may be used by the antenna unit 1 for communication with an external network 3. The wireless communication interface 2 communicates with a cellular network 4 to enable communication with the external network 3. The wireless communication interface 2 comprises a transmit and receive section and an antenna. The antenna may be formed of multiple components for instance the antenna may be in the form of a MIMO antenna.

The antenna unit 1 comprises a first communication interface 5. The first communication interface 2 has a hardware address associated with it. The hardware address may be loaded into the first communication interface 2 upon manufacture of the first communication interface. Alternatively, the hardware address may be generated by the antenna unit upon start-up or may be loaded into the first communication interface 2 upon first start-up and then that address remains as the hardware interface until the first communication interface 2 is reconfigured. The hardware address may be a MAC address. The hardware address may be a physical address. The hardware address may be an identifier used by the first communication interface 2 to communicate at the data link layer. The data link layer may be layer 2 of the OSI model of computer networking.

The antenna unit 1 comprises a processing section 6. The antenna unit 1 is configured to implement methods described herein for controlling the connection of antenna units to the network. These methods can be implemented and controlled by the processing section 6. The processing section 6 could perform its methods using dedicated hardware, using a general-purpose processor executing software code, or using a combination of the two. A processor 7 executes software code stored in a non-transient way in software memory 8 in order to perform its methods. The processing section may comprise one or more processors 7 and one or more memories 8.

The wireless communication interface 2 and the first communication interface 5 are connected to the processing section 6. In this way, processing section 6 is capable of sending and receiving data over the wireless communication interface 2 and/or the first communication interface 5.

Figure 2:
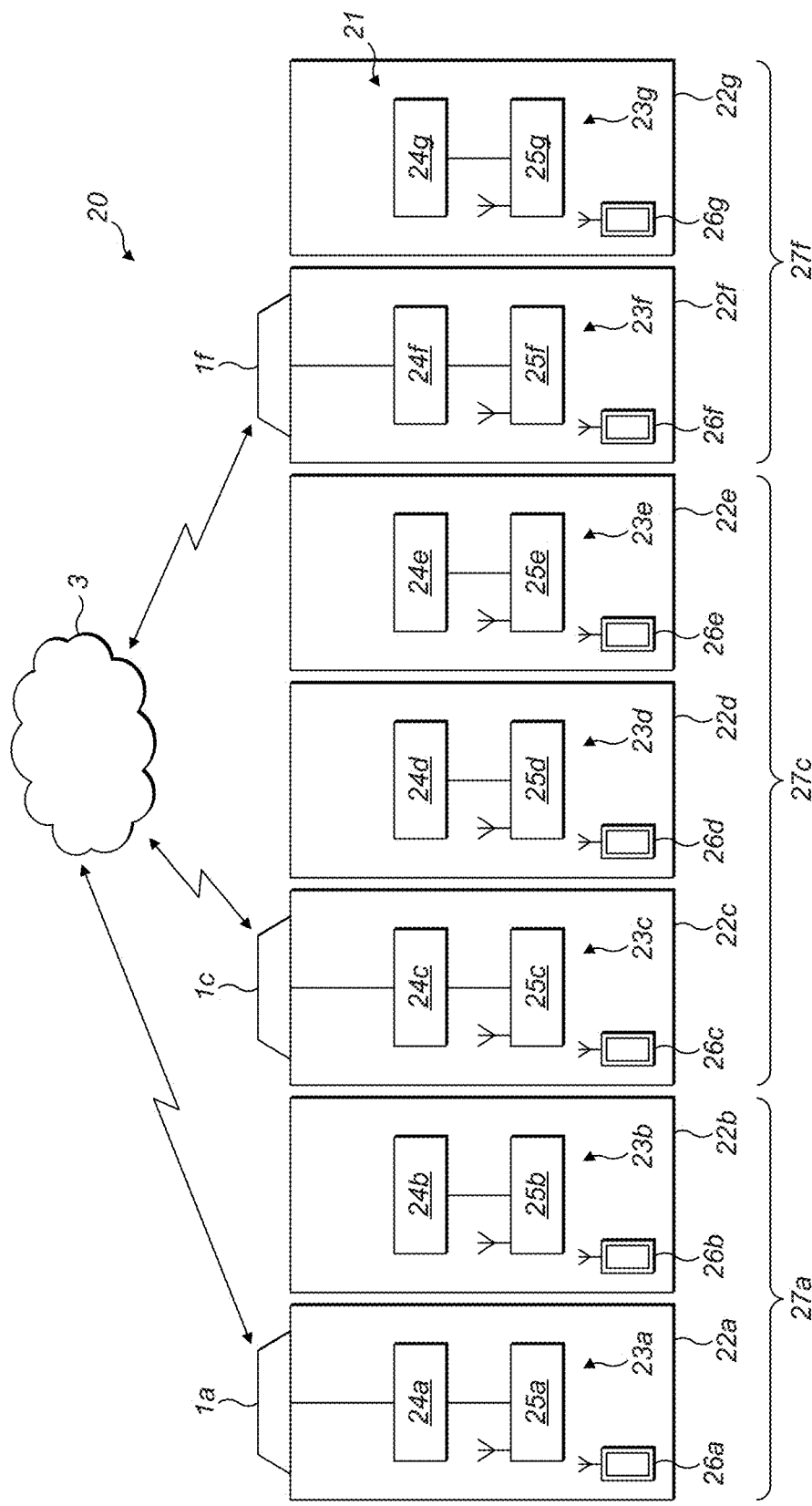
FIG. 2 shows a vehicle comprising a communication network and a plurality of antenna units.

FIG. 2 shows a vehicle 20 comprising a communication network 21. The vehicle 20 comprises a plurality of vehicle segments 22a-g. In the case of a train 20, the vehicle segments 22a-g may be carriages 22a-g. Some of the segments 22 may comprise a power source that enables the segment 22 to be driven. Other segments 22 may simply be capable of being moved by other of the segments 22. In the following discussion, the example vehicle 20 of a train 20 is used together with the vehicle segments 22 being carriages 22. It will however be appreciated that alternative vehicles may have a client network deployed on them in a similar manner to that described in relation to the train 20. For example, the vehicle may be a multi-unit bus or coach that are connected together.

Each carriage 22 comprises a portion of the communication network 23a-g. When the carriages 22 of the train 20 are joined together the portions of the communication network 23 may be linked together by a network link between each of the carriages 22. This network link can be a physical connection between the carriages 22. The network link can be connected between the carriages 22 when the carriages 22 are coupled together. However, preferably, the network link as a wireless connection between the carriages 22. In this way, the network may be formed automatically using the method described herein when the carriages 22 are coupled.

Carriages 22 may be grouped into sections of the train 20. For example, the train 20 may comprise ten carriages 22 and the carriages 22 may be grouped into two sections of five. In the example shown in FIG. 2, the train 20 is grouped into three sections comprising two (22a,22b), three (22c,22d, 22e) and two (22f,22g) carriages respectively. Preferably, the network 21 link between the sections of the train 20 is wireless. The network 21 link between carriages 22 within the section may be wired or wireless. In the example shown in FIG. 2, there is one antenna unit 1 per section of the train 20. In such an example, the network 21 link within the section may be wired and the network 21 link between the sections may be wireless. The combination of wired and wireless network 21 links will depend on the requirements of the network 21. In particular, if the network 21 is be retrofitted to an existing train 20, a combination of wireless and wired connections may be required to make use of existing wired connections.

Each carriage 22 comprises a network switch 24a-g. The network switch 24 is configured to forward data between the devices connected to that network switch 24. The network switch 24 is configured to provide power to devices connected to the network switch 24. The devices may request that power be provided to them over the connection between the network switch 24 and the device connected to the network switch 24. In this way, the network switch 24 may be a Power over Ethernet switch. Whilst only one network switch 24 is pictured in each carriage 22, the carriage 22 may comprise a plurality of network switches 24 should it be required to provide the required connectivity to the carriage 22. Advantageously, only one network switch 24 is provided per carriage 22 as this simplifies the network present in each carriage 22 and means less space needs to be found for the network hardware.

Each carriage 22 comprises a wireless access point 25a-g. The wireless access point 25 is configured to communicate with at least one client device 26a-g. The client device 26 may be located within the carriage 22. The wireless access point 25 is configured to provide access to the communication network 21 to the client devices 26. The wireless access point 25 may draw power from the network switch 24. The carriage 22 may comprise more than one wireless access point 25. For instance, if the carriage 22 is very long, or can accommodate a large number of users, then multiple wireless access points may be required to provide adequate coverage and/or bandwidth.

The carriage may comprise physical network ports (not pictured) which are connected to the network switch 24 to also provide access to the communication network 21. Advantageously, the access to the communication network 21 is provided by the one or more wireless access points 25 present in the carriage 22 as this simplifies the network cabling present within the carriage 22.

The train 20 comprises a plurality of antenna units 1. In FIG. 2, three antenna units are pictured 1a, 1c and 1f. Alternatively, each carriage 22 may comprise an antenna unit 1. The antenna unit 1 of a carriage 22 is connected to network switch 24. The antenna unit 1 may draw power from the network switch 24. The antenna unit 1 being powered by the network switch 24 is advantageous as it simplifies the cabling requirements to the antenna unit 1. The antenna unit 1 is connected to the network switch 24 by the first communication interface 5 of the antenna unit 1. The antenna unit 1 is therefore connected to the communication network 21. The antenna unit 1 is connected to the communication network 21 by the first communication interface 5. Each antenna unit 1 can therefore provide access to an external network 3 to client devices 26 associated with the train 20.

As the antenna units 1 are located along the train 20, there will be a most efficient antenna unit 1 for a respective client device 26 to communicate with to gain access to the external network 3. Therefore, the communication network 21 may be divided logically into a set of network segments. These segments may be related to which of the antenna units 1 responds first to a client device 26 attempting to join the network. This may indicate that a particular antenna unit 1 has more capacity than other antenna units and so is the most efficient one to communicate with at that point. In some instances, these segments will be related to the distance within the communication network 21 from a respective antenna unit 1. The distance may be measured by the latency in the connection between a client device 26 and an antenna unit 1 as the nearer antenna unit 1 is likely to receive signals from the client device 26 slightly quicker and so respond to an initial request from a client device 26 slightly quicker. A network segment 27 associated with each of the antenna units 1a, 1c and 1f are shown in FIG. 2. A network segment 27a is associated with antenna unit 1a. A network segment 27c is associated with antenna unit 1c. A network segment 27f is associated with antenna unit 1f. Whilst the network segments are shown as being separate from each other physically along the train 20, it will be understood that there will likely be at least some overlap in the physical network. For instance, as the carriage 22b is equally spaced between the antenna units 1a and 1c there is likely to be some client devices 26 located in carriage 22b that connect to antenna unit 1a and some that connect to antenna unit 1c. Therefore, some client devices 26 will be located in segment 27a and some client devices 26 will be located in segment 27c. By dividing the network into segments, each antenna unit 1 should have a balanced number of client devices 26 attempting to access the external network via that particular antenna unit 1. The segments may in some cases run along the length of the train 20.

The carriages 22 of the train 20 are configured so that they can be disconnected and reconnected as required to form the required configuration and length of the train 20. This means that the communication network 21 and antenna units 1 that are part of the train 20 may change over time. In addition, the train may be powered off when in a station or depot which would mean that the antenna units 1 would also be powered off. When the train is reconfigured or powered on, the antenna units 1 need to form a client network together so that the client devices can access the external network. It is advantageous if this assembly of the network can occur without manual intervention of an operative as then the train can be reconfigured without external reconfiguration of the network system.

Figure 3:
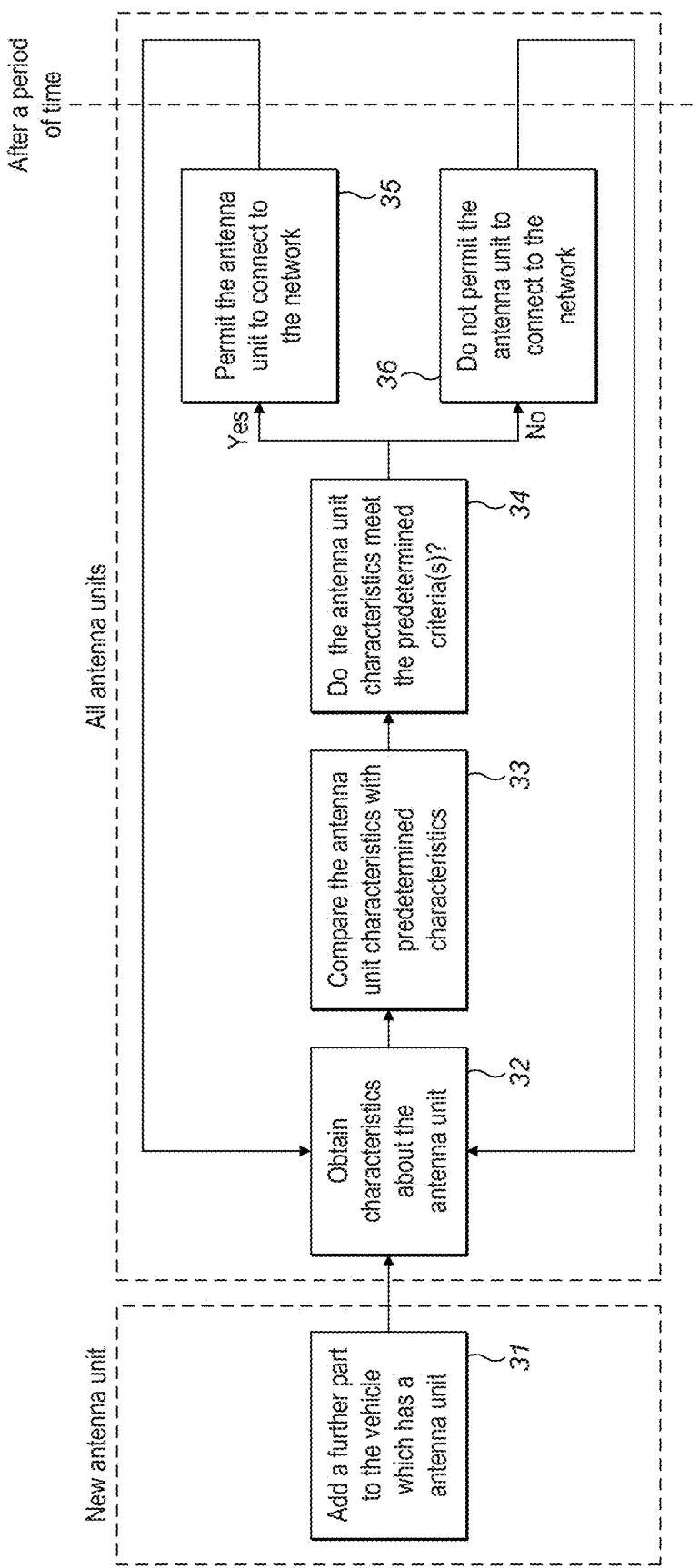
FIG. 3 shows a flow diagram of a method by which a further antenna is permitted to connect to the network.

FIG. 3 shows a flow diagram of the method of permitting an antenna unit 1 to connect to the network 21 implemented on a vehicle 20. The method is implemented by the antenna units 1 to control the connection of antenna units 1 to the network 21 on the vehicle 20. The method that is implemented by the antenna units 1 may provide access to an external network 3. Access to the external network 3 is via the antenna units 1. The method shown in FIG. 3 is implemented by a first antenna unit 1. The antenna unit 1 communicates with other antenna units 1 to establish a client network 21 on the vehicle 20.

The client network 21 on the vehicle 20 may comprise a wireless local area network (LAN) 21. The network 21 may comprise a layer 2 (L2) mesh. In this way, the network 21 may act like a bridge between antenna units 1. In an initial condition of the network 21, the network 21 comprises one or more antenna units 1. A further antenna unit 1 may be permitted to connect to the network 21.

The network 21 has a coverage area. The coverage area is a spatial region in which antenna units 1 are physically able to connect to the network 21. In other words, a further antenna unit 1 may need to be in the coverage area of the network 21 in order to connect to the network 21. Outside of the coverage area the antenna units 1 may not have sufficient signal strength to connect to the network 21. The size of the coverage area may depend on the signal strength of the antenna units 1 in the network 21. The size of the coverage area may decrease in size if there are objects in the way which interfere with the connection between the antenna units 1. The size of the coverage area may be varied by varying the strength of the signal from the antenna units 1. In the example of a train 20, the coverage area will preferably extend to the perimeter of the train 20 such that any antenna units 1 located on the train 20 may connect to the network 21. The coverage area may not extend far beyond the perimeter of the train 20 such that antenna units 21 which are far away from the train 20 do not connect to the network 21.

The further antenna unit 1 may move into the coverage area of the network 21. The further antenna unit 1 may look to connect to the network 21. A further part of the vehicle 20 may comprise the further antenna unit 1. The further antenna unit 1 may be located, or implemented, on a further part of the vehicle 20. For example, the further antenna unit 1 may be located on a further carriage 22 of a train 20. When the further carriage 22 is coupled to the rest of the train 20 the further antenna unit 1 may look to connect to the network 21. This is illustrated by step 31 in FIG. 3. Alternatively, the further antenna unit 1 may be found in the coverage area of the network 21 and look to connect to the network 21 for other reasons. For example, the further antenna unit 1 may have been in the coverage area of the network 21 but was previously turned off. Once the further antenna unit 1 is turned on, the further antenna unit 1 may look to connect to the network 21.

The network 21 may receive a request from the further antenna unit 1 to connect to the network 21. The request to connect to the network 21 may comprise characteristics about the further antenna unit 1. Alternatively, in response to the request to connect, the network 21 may request characteristics about the further antenna unit 1. The network 21 may request characteristics about the further antenna unit 1 if (i) the request to connect did not comprise characteristics about the further antenna unit 1, or (ii) the request to connect did comprise characteristics about the further antenna unit 1 but the characteristics about the further antenna unit 1 were not sufficient or suitable. In any event, the network 21 can obtain characteristics about the further antenna unit 1. This is illustrated by step 32 in FIG. 3.

The characteristics about the further antenna unit 1 may comprise one or more characteristics. The characteristics about the further antenna unit 1 may comprise one or more of the characteristics described herein.

The characteristics about the antenna unit 1 may comprise a signal obtained from that antenna unit 1.

The signal may have characteristics which indicate that the antenna unit 1 is close to the network 21. The signal obtained from the antenna unit 1 may comprise a signal strength. The signal obtained from the antenna unit 1 may comprise a signal to noise ratio (SNR). The characteristics of the signal obtained from the antenna unit 1 may vary depending on how close the antenna unit 1 is to the other antenna units 1 in the network 21. The characteristics of the signal obtained from the antenna unit 1 may vary depending on whether the antenna unit 1 is in the coverage area of the network 21. For example, the closer antenna unit 1 is to the other antenna units 1, the stronger the single strength may be. The closer antenna unit 1 is to the other antenna units 1, the higher the SNR may be. A high signal strength or SNR may indicate the antenna unit 1 is located on a train carriage 22 connected to the rest of the train 20.

The signal may have characteristics which indicate that the antenna unit 1 is intended to connect to the network 21. The signal obtained from the antenna unit 1 may comprise a signal frequency. The signal obtained from the antenna unit 1 may comprise a signal pattern. The characteristics of the signal obtained from the antenna unit 1 may vary depending on whether the antenna unit 1 is intended to connect to the network 21. For example, the antenna unit 1 may provide a signal which indicates that the antenna unit 1 is intended to connect to the network 21. If the antenna unit 1 is intended to connect to the network, the signal frequency may be in a certain band. If the antenna unit 1 is intended to connect to the network 21, the signal may form a certain signal pattern. A correct signal frequency or pattern may indicate the antenna unit 1 is located on a train carriage 22 being connected to the rest of the train 20.

The characteristics about the antenna unit 1 may comprise an age of beacons from that antenna unit 1. The age of beacons indicates how long a signal has been received from the antenna unit 1 by the network 21. For example, an older age of beacons will indicate that the antenna unit 1 has been in the coverage area of the network 21 for a longer period of time. A younger age of beacons will indicate that the antenna unit 1 has been in the coverage area of the network 21 for a shorter period of time. A correct age of beacons may indicate the antenna unit 1 is located on a train carriage 22 connected to the rest of the train 20.

The characteristics about the antenna unit 1 may comprise a global navigation satellite system (GNSS) location obtained from that antenna unit 1. The GNSS location may comprise a global positioning system (GPS) location, a global navigation satellite system (GLONASS) location, a Galileo location, and/or a BeiDou location. The GNSS location of the antenna unit 1 may be continually updated and provided to the network 21. In this way, the location of the antenna unit 1 may be updated in live time. The GNSS location of the antenna unit 1 will indicate the location of the antenna unit 1 and if the antenna unit 1 is in close proximity to the network 21. For example, a GNSS location which is close to the network 21 may indicate that the antenna unit 1 should be in the coverage area of the network 21. A correct GNSS location may indicate the antenna unit 1 is located on a train carriage 22 connected to the rest of the train 20. The characteristics about the antenna unit 1 may comprise a velocity and/or bearing of the vehicle 20 onto which the antenna unit 1 is implemented. The velocity and/or bearing may be obtained from the GNSS location, i.e. the rate of change of the GNSS location. The velocity and or bearing may be obtained from the vehicle 20.

The characteristics about the antenna unit 1 may comprise information about the vehicle 20 onto which the antenna unit 1 is implemented. The information may indicate what the vehicle 20 is. For example, the information may provide an identifier for the train carriage 22 which comprises the antenna unit 1. The identifier may comprise a serial number for the carriage 22. Correct information may indicate the antenna unit 1 is located on a train carriage 22 being connected to the rest of the train 20.

The characteristics about the further antenna unit 1 are compared against predetermined characteristics. The predetermined characteristics may comprise one or more characteristics. The predetermined characteristics may correspond to the characteristics about the further antenna unit 1. The predetermined characteristics may provide a criterion for the characteristics about the further antenna unit 1. The predetermined characteristics criterion may comprise a threshold, range and/or result for the characteristics about the further antenna unit 1 to be compared against. The type of criterion may depend on the type of characteristics about the further antenna unit 1. The comparison between the characteristics about the further antenna unit 1 and the predetermined characteristics is illustrated by 33 in FIG. 3.

In embodiments where the characteristics about the antenna unit 1 comprise a signal obtained from that antenna unit 1, the predetermined characteristics criterion may comprise a threshold, range and/or result. If the signal obtained from the antenna unit 1 comprises a signal strength, the signal strength may be compared against a signal strength threshold or range. If the signal obtained from the antenna unit 1 comprises a SNR, the SNR may be compared against a SNR threshold or range. If the signal obtained from the antenna unit 1 comprises a signal frequency, the signal frequency may be compared against a signal frequency threshold or range. If the signal obtained from the antenna unit 1 comprises a signal pattern, the signal pattern may be compared against a signal pattern result.

In embodiments where characteristics about the antenna unit 1 comprise an age of beacons from that antenna unit 1, the age of beacons may be compared against an age of beacons time threshold or range. In embodiments where the characteristics about the antenna unit 1 comprise a GNSS location obtained from that antenna unit 1, the GNSS location may be compared against a GNSS location range or result. In embodiments where the characteristics about the antenna unit 1 comprise a velocity and/or bearing obtained from that antenna unit 1, the velocity and/or bearing may be compared against a velocity and/or bearing range or result. In embodiments where the characteristics about the antenna unit 1 comprise information about the vehicle 20 onto which the antenna unit 1 is implemented, the information may be compared against an expected result for the information about the vehicle 20.

In dependence on the comparison between the characteristics, a decision is made to determine whether the further antenna unit 1 is permitted to connect to the network 21 or not. In particular, if the comparison between the characteristics indicates that the further antenna unit 1 is located on the vehicle, then the further antenna unit 1 is permitted to connect to the network 21. Conversely, if the comparison between the characteristics indicates that the further antenna unit 1 is not located on the vehicle, then the further antenna unit 1 is not permitted to connect to the network 21. The determination of whether the antenna unit 1 characteristics meet the predetermined criterion is illustrated by step 34 in FIG. 3. Step 35 illustrates that when the antenna unit 1 characteristics meet the predetermined criterion, the antenna unit 1 is permitted to connect to the network 21. Step 36 illustrates that when the antenna unit 1 characteristics do not meet the predetermined criterion, the antenna unit 1 is not permitted to connect to the network 21.

In embodiments where the characteristics about the antenna unit 1 comprise a signal obtained from that antenna unit 1, if the signal meets the predetermined characteristics criterion, the antenna unit 1 is permitted to connect to the network 21. Conversely, if the signal does not meet the predetermined characteristics criterion, the antenna unit 1 is not permitted to connect to the network 21.

If the characteristics obtained from the antenna unit 1 comprises a signal strength, and the signal strength meets the signal strength threshold or range, the antenna unit 1 is permitted to connect to the network 21. To meet the criterion, the signal strength must be higher than the threshold, or within the range. Conversely, if the signal strength does not meet the signal strength threshold or range, the antenna unit 1 is not permitted to connect to the network 21. In this way, the antenna unit 1 may only be permitted to connect to the network 21 when the antenna unit 1 is in the correct location to provide the correct signal strength. For example, the antenna unit 1 of a new train carriage 22 may only be permitted to connect to the network 21 if the signal indicates that the new train carriage 22 is part of the rest of the train 20. Alternatively, the antenna unit 1 of a train carriage 22 of a different train may not be permitted to connect to the network 21 if the signal indicates that the train carriage 22 is not part of the rest of the train 20. To indicate that the antenna unit 1 is close enough to the train 20, and so is part of the train 20, the signal strength must be higher than the threshold, or be within the range. This may avoid connections with antenna units 1 on carriages 22 which are too far away to be on the train 20 of the network 21.

If the characteristics obtained from the antenna unit 1 comprises a SNR, and the SNR meets the SNR threshold or range, the antenna unit 1 is permitted to connect to the network 21. To meet the criterion, the SNR must be higher than the threshold, or within the range. Conversely, if the SNR does not meet the SNR threshold or range, the antenna unit 1 is not permitted to connect to the network 21. In this way, the antenna unit 1 may only be permitted to connect to the network 21 when the antenna unit 1 is in the correct location to provide the correct SNR. For example, the antenna unit 1 of a new train carriage 22 may only be permitted to connect to the network 21 if the signal indicates that the new train carriage 22 is part of the rest of the train 20. Alternatively, the antenna unit 1 of a train carriage 22 of a different train may not be permitted to connect to the network 21 if the signal indicates that the train carriage 22 is not part of the rest of the train 20. To indicate that the antenna unit 1 is close enough to the train 20, and so is part of the train 20, the SNR must be higher than the threshold, or be within the range. This may avoid connections with antenna units 1 on carriages 22 which are too far away to be on the train 20 of the network 21.

If the characteristics obtained from the antenna unit 1 comprises a signal frequency, and the signal frequency meets the signal frequency threshold or range, the antenna unit 1 is permitted to connect to the network 21. To meet the criterion, the signal frequency must be higher or lower than the threshold (depending on the correct result), or within the range. Conversely, if the signal frequency does not meet the signal frequency threshold or range, the antenna unit 1 is not permitted to connect to the network 21. In this way, the antenna unit 1 may only be permitted to connect to the network 21 when the antenna unit 1 is configured to provide the correct signal frequency. For example, the antenna unit 1 of a new train carriage 22 may only be permitted to connect to the network 21 if the signal indicates that the new train carriage 22 is intended to be part of the rest of the train 20. Alternatively, the antenna unit 1 of a train carriage 22 of a different train may not be permitted to connect to the network 21 if the signal indicates that the train carriage 22 is not part of the rest of the train 20. To indicate that the antenna unit 1 is producing the correct signal, and so is part of the train 20, the signal frequency must be higher or lower than the threshold (depending on the correct result), or be within the range. This may avoid connections with antenna units 1 on carriages 22 which are not the correct type of carriage 22 to be on the train 20 of the network 21.

If the characteristics obtained from the antenna unit 1 comprises a signal pattern, and the signal frequency meets the signal pattern result, the antenna unit 1 is permitted to connect to the network 21. To meet the criterion, the signal pattern must match the correct pattern result, or be within an error range of the correct pattern result. Conversely, if the signal frequency does not meet the signal pattern result, the antenna unit 1 is not permitted to connect to the network 21. In this way, the antenna unit 1 may only be permitted to connect to the network 21 when the antenna unit 1 is in the correct location to provide the signal pattern. A correct signal pattern may follow a certain frequency-amplitude shape. For example, the antenna unit 1 of a new train carriage 22 may only be permitted to connect to the network 21 if the signal indicates that the new train carriage 22 is part of the rest of the train 20. Alternatively, the antenna unit 1 of a train carriage 22 of a different train may not be permitted to connect to the network 21 if the signal indicates that the train carriage 22 is not part of the rest of the train 20. To indicate that the antenna unit 1 is producing the correct signal, and so is part of the train 20, the signal pattern must match the correct pattern result, or be within an error range of the correct pattern result. This may avoid connections with antenna units 1 on carriages 22 which are not the correct type of carriage 22 to be on the train 20 of the network 21.

If the characteristics obtained from the antenna unit 1 comprises an age of beacons, and the age of beacons meets the age of beacons threshold or range, the antenna unit 1 is permitted to connect to the network 21. To meet the criterion, the age of beacons must be higher or lower than the threshold (depending on the correct result), or within the range. Conversely, if the age of beacons does not meet the age of beacons threshold or range, the antenna unit 1 is not permitted to connect to the network 21. In this way, the antenna unit 1 may only be permitted to connect to the network 21 when the antenna unit 1 is in the correct location for the correct amount of time to provide the correct age of beacons. For example, the antenna unit 1 of a new train carriage 22 may only be permitted to connect to the network 21 if the signal indicates that the new train carriage 22 is part of the rest of the train 20. Alternatively, the antenna unit 1 of a train carriage 22 of a different train may not be permitted to connect to the network 21 if the signal indicates that the train carriage 22 is not part of the rest of the train 20. To indicate that the antenna unit 1 has been sending a signal for the correct amount of time, and so is part of the train 20, the age of beacons must be higher or lower than the threshold (depending on the correct result), or be within the range. In this example, a correct age of beacons may be the time for which it takes to connect a train. This may avoid connections with antenna units 1 located on trains 20 that are only passing by for a short time.

If the characteristics obtained from the antenna unit 1 comprises a GNSS location, and the GNSS location meets the GNSS location result or range, the antenna unit 1 is permitted to connect to the network 21. To meet the criterion, the GNSS location must be within the range or the correct result. Conversely, if the GNSS location does not meet the GNSS location result or range, the antenna unit 1 is not permitted to connect to the network 21. In this way, the antenna unit 1 may only be permitted to connect to the network 21 when the antenna unit 1 is in the correct location to provide the correct GNSS location. For example, the antenna unit 1 of a new train carriage 22 may only be permitted to connect to the network 21 if the GNSS location indicates that the new train carriage 22 is part of the rest of the train 20. Alternatively, the antenna unit 1 of a train carriage 22 of a different train may not be permitted to connect to the network 21 if the GNSS location indicates that the train carriage 22 is not part of the rest of the train 20. To indicate that the antenna unit 1 is in the correct location, and so is part of the train 20, the GNSS location must be the correct result, or be within the range. In this example, a correct GNSS location may be distance and location of a further carriage 22 when connecting to the train. This may avoid connections with antenna units 1 located on trains 20 that are only passing by on a different railway line.

If the characteristics obtained from the antenna unit 1 comprises a velocity and/or bearing, and the velocity and/or bearing meets the velocity and/or bearing result or range, the antenna unit 1 is permitted to connect to the network 21. To meet the criterion, the velocity and/or bearing must be within the range or the correct result.

Conversely, if the velocity and/or bearing does not meet the velocity and/or bearing result or range, the antenna unit 1 is not permitted to connect to the network 21. In this way, the antenna unit 1 may only be permitted to connect to the network 21 when the antenna unit 1 is not moving at the correct velocity, or in the correct direction, to provide the correct velocity and/or bearing. For example, the antenna unit 1 of a new train carriage 22 may only be permitted to connect to the network 21 if the velocity and/or bearing indicates that the new train carriage 22 is part of the rest of the train 20. Alternatively, the antenna unit 1 of a train carriage 22 of a different train may not be permitted to connect to the network 21 if the velocity and/or bearing indicates that the train carriage 22 is not part of the rest of the train 20. To indicate that the antenna unit 1 has the correct velocity and/or bearing, and so is part of the train 20, the velocity and/or bearing must be the correct result, or be within the range. In this example, a correct velocity and/or bearing may be the same velocity and/or bearing or the rest of the train 20. This may avoid connections with antenna units 1 located on trains 20 that are only passing by on a different railway line.

The velocity and/or bearing of the vehicle 20 may be used in combination with the GNSS location. For example, the GNSS location may only have a certain level of accuracy. For example, a GPS location may only be accurate to within 2 m. The velocity and/or bearing of the vehicle 20 may be used to verify the GPS location, or provide additional characteristics to be tested. This is particularly useful when two vehicles are very close together, for example within the 2 m accuracy level of GPS.

If the characteristics obtained from the antenna unit 1 comprises information about the vehicle 20, and the information about the vehicle 20 meets the result expected for the information about the vehicle 20, the antenna unit 1 is permitted to connect to the network 21. To meet the criterion, the information about the vehicle 20 must match the expected information about the vehicle 20, or comprise minimal errors. Conversely, if the information about the vehicle 20 does not meet the result expected for the information about the vehicle, the antenna unit 1 is not permitted to connect to the network 21. In this way, the antenna unit 1 may only be permitted to connect to the network 21 when the antenna unit 1 is configured to provide the correct information about the vehicle 20. For example, the antenna unit 1 of a new train carriage 22 may only be permitted to connect to the network 21 if the information indicates that the new train carriage 22 is part of the rest of the train 20. Alternatively, the antenna unit 1 of a train carriage 22 of a different train may not be permitted to connect to the network 21 if the information indicates that the train carriage 22 is not part of the rest of the train 20. To indicate that the antenna unit 1 is located on a carriage 22 which is connected to the rest of the train 20, the information about the vehicle 20 must match the expected information about the vehicle 20, or comprise minimal errors. In this example, correct information about the vehicle 20 may be that serial code of the carriage 22 indicates that the antenna unit 1 is located on the carriage 22 which has just coupled to the rest of the train 20. This may avoid connections with antenna units 1 located on carriages 22 that are not coupled to the rest of the train 20.

The antenna unit 1 may be permitted to connect to the network 21 in dependence on a predefined number of characteristics meeting a required criterion. Conversely, the antenna unit 1 may not be permitted to connect to the network 21 in dependence on a predefined number of characteristics not meeting a required criterion. In other words, there may be a set number of criteria, as described herein, and the antenna unit 1 must reach a certain number of the criteria to be connected to the network 21. Preferably, the antenna unit 1 must reach all of the criteria to be connected to the network 21. However, as there may be interference in the signals, it may be that only a significant proportion of the criteria are required for connection to be permitted.

The characteristics about the about the further antenna unit 1 may be repeatedly compared with the predetermined characteristics. In dependence on this repeated comparison, the further antenna unit 1 may be permitted to connect to the network 21 during one of the iterations. This is illustrated by the arrows linking steps 35 and 36 with step 32 in FIG. 3. In other words, once the further antenna unit 1 has been permitted to connect to the network 21, it may be continually assessed as to whether the further antenna unit 1 should be permitted to stay connected to the network 21. In this way, if the characteristics about the further antenna unit 1 indicate that the further antenna unit 1 is no longer located on the vehicle 20, then it may no longer be permitted to be connected to the network 21. Conversely, if the further antenna unit 1 was not permitted to connect to the network 21, it may be continually assessed as to whether the further antenna unit 1 should be permitted to connect to the network 21. In this way, if the characteristics about the further antenna unit 1 indicate that the further antenna unit 1 is now located on the vehicle 20, then it may be permitted to be connected to the network 21.

In an alternative embodiment, if the further antenna unit 1 is permitted to connect to the network 21, the obtaining of characteristics about the antenna unit 1 step, the subsequent comparison step, and the determining step, may be stopped. In this way, once the further antenna unit 1 is connected to the network 21, it may be assumed that the antenna unit 1 may stay connected to the network 21.

FIG. 3 shows a section designated for new antenna units 1 (31), and a section designated for all antenna units 1 (32,33,34,35,36). Coupling a further part 22 to the rest of the vehicle 20, as illustrated at step 31, can result in a new antenna unit 1 trying to connect to the network 21. Steps 32,33,34,35,36 are then carried out for that new antenna unit 1. However, steps 32,33,34,35,36 may also be applied to existing antenna units 1 which are already in the network 21.

Characteristics may be obtained from each of the antenna units 1. The characteristics from the antenna units 1 may be as described herein. The characteristics from each of the antenna units 1 may be compared with predetermined characteristics. The predetermined characteristics may be as described herein. It is determined whether each of the antenna units 1 meet the predetermined criteria. The criteria may be as described herein. Each of the antenna units 1 may be permitted or not permitted to connect to the network 21 in dependence on the respective determinations.

Figure 4:
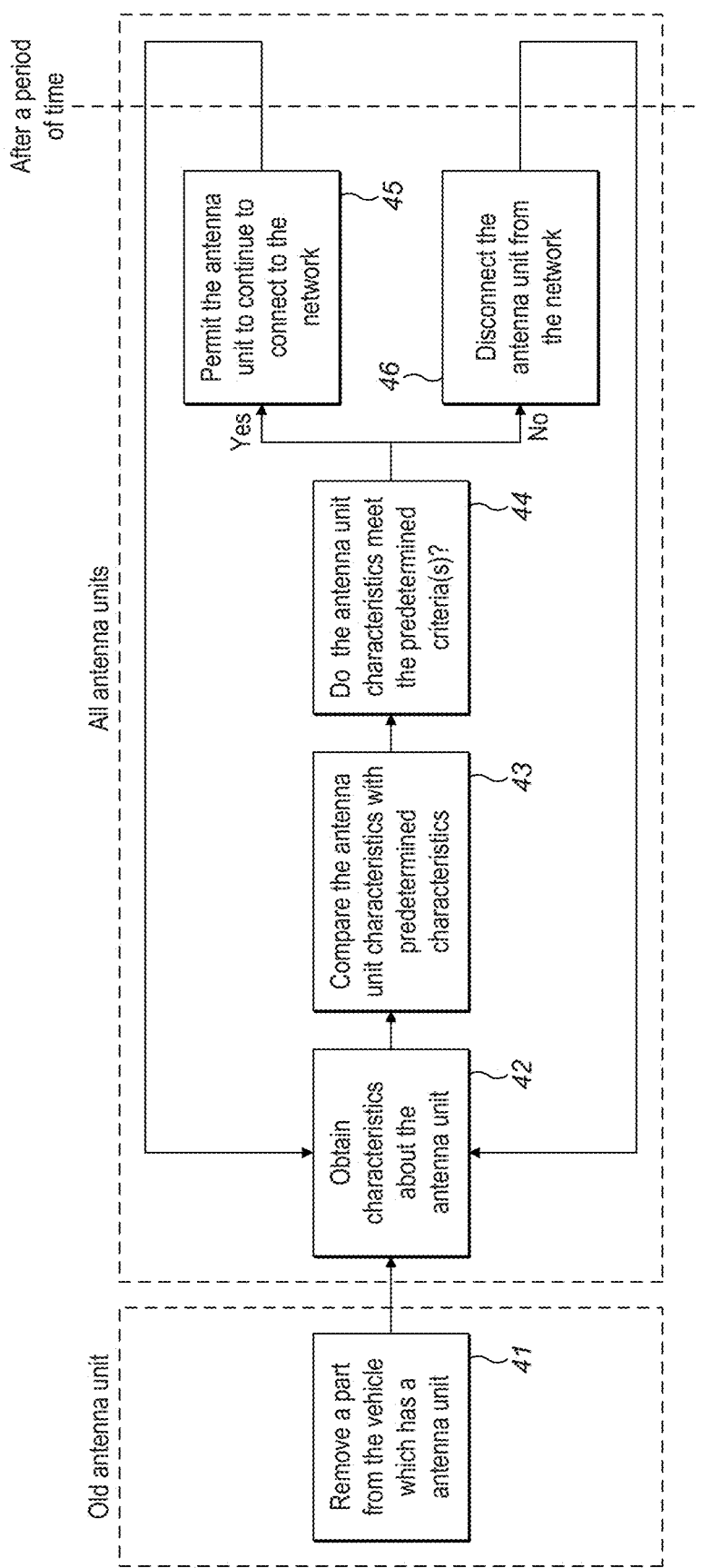
FIG. 4 shows a flow diagram of a method by which an antenna is disconnected from the network.

FIG. 4 shows a flow diagram of the method of disconnecting an antenna unit 1 from the network 21 implemented on a vehicle 20. The method is implemented by the antenna units 1 to control the disconnection of antenna units 1 from the network 21 on the vehicle 20. The method shown in FIG. 3 is implemented by a first antenna unit 1. The antenna unit 1 communicates with other antenna units 1 to establish a client network on the vehicle 20.

In an initial condition of the network 21, the network 21 comprises one or more antenna units 1. One or more antenna units 1 may be disconnected from the network 21.

The antenna unit 1 may move out of the coverage area of the network 21. A part of the vehicle 20 may comprise the antenna unit 1. The antenna unit 1 may be located, or implemented, on a part of the vehicle 20. For example, the antenna unit 1 may be located on a carriage 22 of a train 20. When the carriage 22 is uncoupled from the rest of the train 20 the antenna unit 1 may move out of the network 21. This is illustrated by step 41 in FIG. 4.

The network 21 may request characteristics from the antenna unit 1. The network 21 may request characteristics about the antenna unit 1. Alternatively, the antenna unit 1 may be configured to provide the characteristics to the network 21. In any event, the network 21 can obtain characteristics about the antenna unit 1. This is illustrated by step 42 in FIG. 4.

The characteristics about the antenna unit 1 may comprise one or more characteristics. The characteristics may about the antenna unit 1 comprise one or more of the characteristics described herein.

The characteristics about the antenna unit 1 are compared against predetermined characteristics. The predetermined characteristics may comprise one or more characteristics. The predetermined characteristics may correspond to the characteristics about the antenna unit 1. The predetermined characteristics may provide a criterion for the characteristics about the antenna unit 1. The predetermined characteristics criterion may comprise a threshold, range and/or result for the characteristics about the antenna unit 1 to be compared against. The type of criterion may depend on the type of characteristics about the antenna unit 1. The comparison between the characteristics about the antenna unit 1 and the predetermined characteristics is illustrated by 43 in FIG. 4. The criterion for each of the different types of characteristics about the antenna unit 1 and the corresponding predetermined characteristics may be as described herein.

In dependence on the comparison between the characteristics, a decision is made to determine whether the antenna unit 1 is disconnected from the network 21 or not. In particular, if the comparison between the characteristics indicates that the antenna unit 1 is still located on the vehicle 20, then the antenna unit 1 remains connected to the network 21. Conversely, if the comparison between the characteristics indicates that the antenna unit 1 is not located on the vehicle 20, then the antenna unit 1 is disconnected from the network 21. The determination of whether the antenna unit 1 characteristics meet the predetermined criterion is illustrated by step 44 in FIG. 4. Step 45 illustrates that when the antenna unit 1 characteristics meet the predetermined criterion, the antenna unit 1 is permitted to continue to connect to the network 21. Step 46 illustrates that when the antenna unit 1 characteristics do not meet the predetermined criterion, the antenna unit 1 is disconnected from the network 21.

The antenna unit 1 may be permitted to continue to connect to the network 21 in dependence on a predefined number of characteristics meeting a required criterion. Conversely, the antenna unit 1 may be disconnected from the network 21 in dependence on a predefined number of characteristics not meeting a required criterion. In other words, there may be a set number of criteria, as described herein, and the antenna unit 1 must reach a certain number of the criteria to be permitted to stay connected to the network 21. Preferably, the antenna unit 1 must reach all of the criteria to be permitted to stay connected to the network 21. However, as there may be interference in the signals, it may be that only a significant proportion of the criteria are required for connection to be permitted.

The characteristics about the about the antenna unit 1 may be repeatedly compared with the predetermined characteristics. In dependence on this repeated comparison, the antenna unit 1 may be disconnected from the network 21 during one of the iterations. This is illustrated by the arrows linking steps 45 and 46 with step 42 in FIG. 4. In other words, once the antenna unit 1 has been permitted to connect to the network 21, it may be continually assessed as to whether the antenna unit 1 should be disconnected from the network 21. In this way, if the characteristics about the antenna unit 1 indicate that the antenna unit 1 is no longer located on the vehicle 20, then it may be disconnected from the network 21. Conversely, if the antenna unit 1 was disconnected from the network 21, it may be continually assessed as to whether the antenna unit 1 should be permitted to connect to the network 21. In this way, if the characteristics about the antenna unit 1 indicate that the antenna unit 1 is now located on the vehicle 20, then it may be permitted to connect to the network 21.

In an alternative embodiment, if the antenna unit 1 is disconnected from the network 21, the obtaining of characteristics about the antenna unit 1 step, the subsequent comparison step, and the determining step, may be stopped. In this way, once the antenna unit 1 is disconnected from the network 21, it may be assumed that the antenna unit 1 may stay disconnected from the network 21.

FIG. 4 shows a section designated for old antenna units 1 (41), and a section designated for all antenna units 1 (42,43,44,45,46). Decoupling a part 22 from the rest of the vehicle 20, as illustrated at step 41, can result in an old antenna unit 1 moving away from the network 21. Steps 42,43,44,45,46 are then carried out for that old antenna unit 1. However, steps 42,43,44,45,46 may also be applied to other antenna units 1 which are in the network 21. Characteristics may be obtained from each of the antenna units 1. The characteristics from the antenna units 1 may be as described herein. The characteristics from each of the antenna units 1 may be compared with predetermined characteristics. The predetermined characteristics may be as described herein. It is determined whether each of the antenna units 1 meet the predetermined criteria. The criteria may be as described herein. Each of the antenna units 1 may be permitted to continue to connect to the network 21, or may be disconnected from the network 21, in dependence on the respective determinations.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for controlling the connection of antenna units to a wireless local area network, the wireless local area network comprising one or more antenna units and being implemented on a vehicle, the method comprising:
   obtaining a plurality of different characteristics about a further antenna unit that is external to the network;
   comparing the plurality of different characteristics about the further antenna unit with a corresponding plurality of different predetermined characteristics, the plurality of different predetermined characteristics each providing a criterion for the corresponding characteristic about the further antenna unit; and
   in dependence on each of the plurality of different characteristics about the further antenna unit meeting the required criterion indicating that the further antenna unit is located on the vehicle, permitting the further antenna unit to connect to the network.

2. The method according to claim 1, wherein the method comprises repeatedly obtaining characteristics about the further antenna unit, repeatedly comparing the characteristics about the further antenna unit with the predetermined characteristics, and in dependence on the comparison between the characteristics indicating that the further antenna unit is located on the vehicle, permitting the further antenna unit to connect to the network.

3. The method according to claim 1, wherein the method comprises, after the further antenna unit is permitted to connect to the network, stopping obtaining characteristics about the further antenna unit.

4. The method according to claim 1, wherein the method comprises, after the further antenna unit is permitted to connect to the network, continuing to obtain characteristics about the further antenna unit and to compare the characteristics about the further antenna unit with the predetermined characteristics, and in dependence on the comparison between the characteristics indicating that the further antenna unit is no longer located on the vehicle, disconnecting the further antenna unit from the network.

5. The method according to claim 1, wherein the method comprises obtaining characteristics about each of the antenna units that are in the network and comparing the characteristics about each of the antenna units that are in the network with the predetermined characteristics, and in dependence on the comparison between the characteristics indicating that one or more of the antenna units are no longer located on the vehicle, disconnecting those one or more of the antenna units from the network.

6. The method according to claim 1, wherein the characteristics about an antenna unit comprise a signal obtained from that antenna unit.

7. The method according to claim 6, wherein the method comprises permitting the further antenna unit to connect to the network in dependence on its signal being higher than a predetermined signal threshold or wherein the method comprises disconnecting one or more of the antenna units from the network in dependence on its signal being lower than a predetermined signal threshold.

8. The method according to claim 1, wherein the characteristics about an antenna unit comprise a signal to noise ratio of the signal obtained from that antenna unit.

9. The method according to claim 8, wherein the method comprises permitting the further antenna unit to connect to the network in dependence on its signal to noise ratio of the signal being higher than a predetermined signal to noise ratio threshold, or wherein the method comprises disconnecting one or more of the antenna units from the network in dependence on its signal to noise ratio of the signal being lower than a predetermined signal to noise ratio threshold.

10. The method according to claim 1, wherein the characteristics about an antenna unit comprise an age of beacons obtained from that antenna unit.

11. The method according to claim 10, wherein the method comprises permitting the further antenna unit to connect to the network in dependence on its age of beacons being lower than a predetermined time threshold, or wherein the method comprises disconnecting one or more of the antenna units from the network in dependence on its age of beacons being higher than a predetermined time threshold.

12. The method according to claim 1, wherein the characteristics about an antenna unit comprise a GNSS location obtained from that antenna unit.

13. The method according to claim 12, wherein the method comprises permitting the further antenna unit to connect to the network in dependence on its GNSS location being within a predetermined distance threshold from a predefined point in the network, or wherein the method comprises disconnecting one or more of the antenna units from the network in dependence on its GNSS location being outside of a predetermined distance threshold from a predefined point in the network.

14. The method according to claim 1, wherein the method comprises:
   before obtaining one or more characteristics about the further antenna unit that is external to the network, adding a further part to the vehicle, the further part comprising the further antenna unit; and
   in dependence on the comparison between the characteristics indicating that the further antenna unit is now located on the vehicle, permitting the further antenna unit to connect to the network.

15. A method for controlling the connection of antenna units to a wireless local area network, the wireless local area network comprising one or more antenna units and being implemented on a vehicle, the method comprising:
   obtaining a plurality of different characteristics about an antenna unit that is in the network;
   comparing the plurality of different characteristics about the antenna unit with a corresponding plurality of different predetermined characteristics, the plurality of different predetermined characteristics each providing a criterion for the corresponding characteristic about the antenna unit; and
   in dependence on each of the plurality of different characteristics about the antenna unit meeting the required criterion indicating that the antenna unit is not located on the vehicle, disconnecting the antenna unit from the network.

16. The method according to claim 15, wherein the method comprises, before obtaining one or more characteristics about the antenna unit, removing a part of the vehicle, the part comprising the antenna unit, and in dependence on the comparison between the characteristics indicating that the antenna unit is no longer located on the vehicle, disconnecting the antenna unit from the network.

17. The method according to claim 1, wherein the network comprises a L2 mesh.

18. The method according to claim 1, wherein the vehicle is a train.

19. A wireless local area network system comprising one or more antenna units, the system being configured to:
   obtain a plurality of different characteristics about a further antenna unit that is external to the network;
   compare the plurality of different characteristics about the further antenna unit with a corresponding plurality of predetermined characteristics, the plurality of different predetermined characteristics each providing a criterion for the corresponding characteristic about the further antenna unit; and
   in dependence on each of the plurality of different characteristics about the further antenna unit meeting the required criterion indicating that the further antenna unit is located on the vehicle, permit the further antenna unit to connect to the network.

20. A wireless local area network system comprising one or more antenna units, the system being configured to:
   obtain a plurality of different characteristics about an antenna unit that is in the network;
   compare the plurality of different characteristics about the antenna unit with a corresponding plurality of different predetermined characteristics, the plurality of different predetermined characteristics each providing a criterion for the corresponding characteristic about the antenna unit; and
   in dependence on each of the plurality of different characteristics about the antenna unit meeting the required criterion indicating that the antenna unit is not located on the vehicle, disconnect the antenna unit from the network.

* * * * *